Oct. 29, 1968  M. I. DAVIDSSON  3,407,763
DEVICE FOR SEPARATING THREAD CONNECTED WORKPIECES
Filed April 18, 1966  2 Sheets-Sheet 1
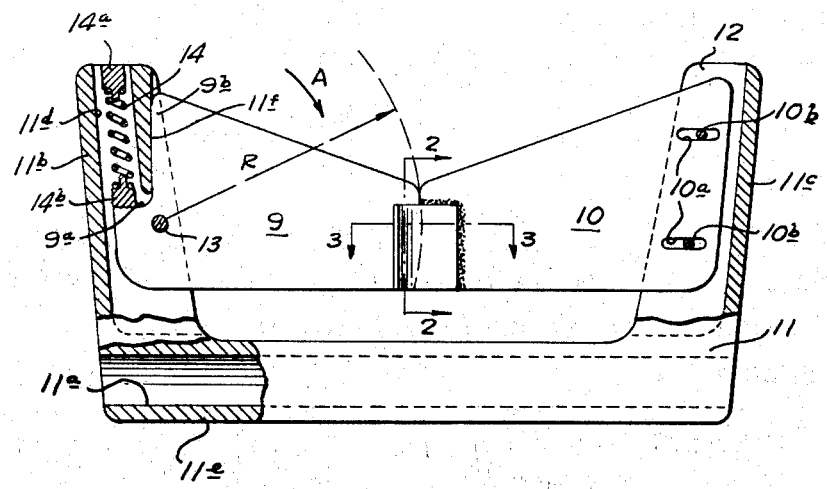
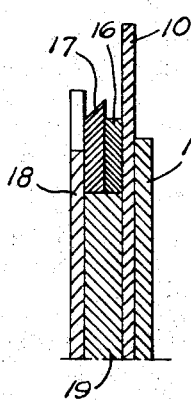
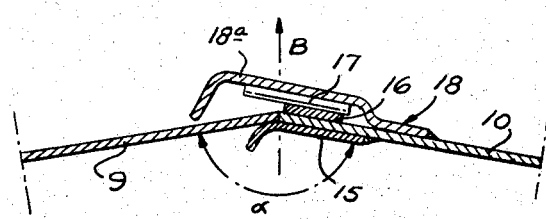
INVENTOR.
MATS INGVAR DAVIDSSON
BY
ATTORNEYS.

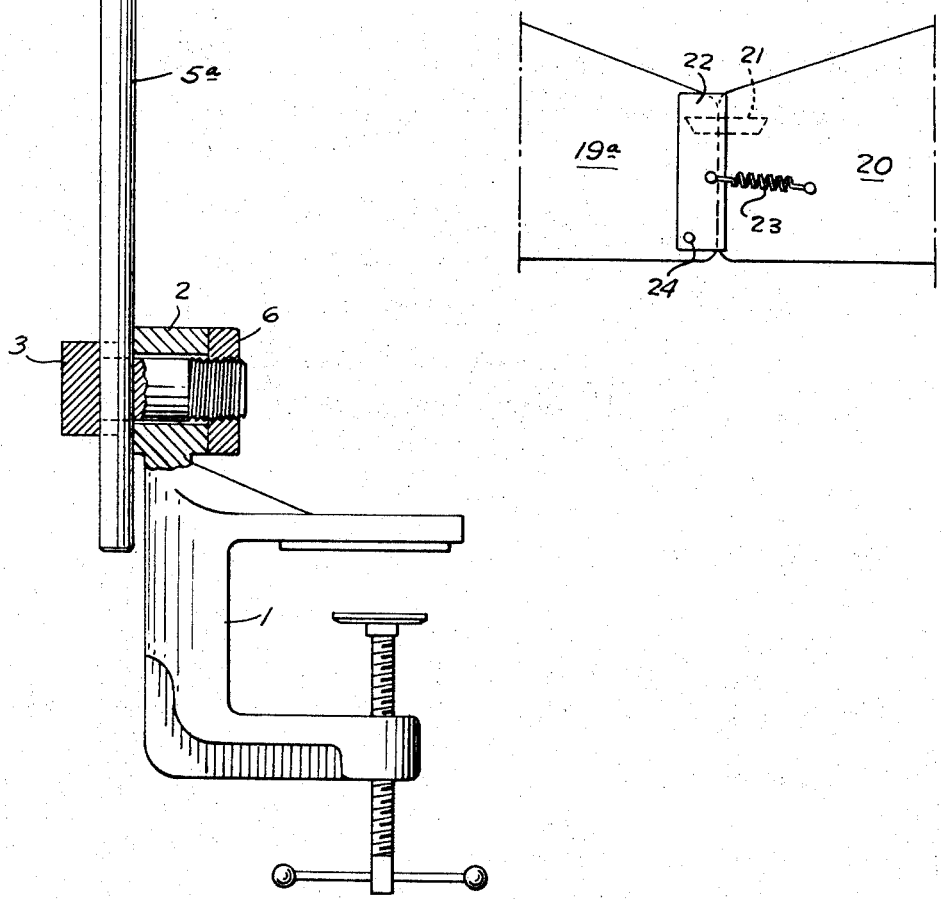

United States Patent Office
3,407,763
Patented Oct. 29, 1968

3,407,763
DEVICE FOR SEPARATING THREAD
CONNECTED WORKPIECES
Mats Ingvar Davidsson, Ganghester, Sweden
Filed Apr. 18, 1966, Ser. No. 543,111
8 Claims. (Cl. 112—252)

ABSTRACT OF THE DISCLOSURE

The present device is for separating consecutive workpieces in a series of thread connected workpieces and includes a pair of divergent resilient plates having slideable contacting free ends for detachably clamping a thread therebetween, a cutting element retained adjacent said plate free ends and an adjustable support for said plates.

---

This invention refers to a device, which is intended to be used in connection with the manufacturing of clothes, and more specifically it has for its purpose to provide for a highly automatic manufacturing process. In making, for example, shirts, each shirt portion such as the collar, cuff, front piece and the like is sewn in a series of units. The units of each series thereof hereinafter referred to as workpieces, are sewn without the intermediate cutting off of the thread, which means that the workpieces hang together by means of the thread. In order to transfer the workpieces to other work stations, for example to such stations where the workpieces are assembled and sewn to a shirt, it is necessary to separate the workpieces from each other, i.e., to cut off the thread connecting two consecutive workpieces. It is also necessary to position each workpiece in such a position that it may be readily picked up by a transfer device.

The main object of the invention is to provide a device, with the aid of which, both these aforementioned requirements may be fulfilled in one simple operation. Other objects and advantages of the invention will be apparent from the following specification and drawings, in which:

FIG. 1 is a front view partly in section of the present device,

FIG. 2 and FIG. 3 constitute sections taken along lines II—II and III—III respectively of FIG. 1, FIG. 4 is a side elevation, partly in section, of a support for said device, and FIG. 5 is a side elevation of a modification to said device.

The device comprises a support, which includes a screw clamp 1 adapted to be applied to a work table (not shown) or the like. Fastened to the upper portion of said clamp is a horizontal sleeve 2, adapted to receive a bolt 3, which is provided with a lateral opening 4 for the reception of a leg 5a of a tube 5, which is bent at right angles according to FIG. 4 of the drawings. By means of the aforementioned construction it is possible to set the tube at any desired height and angle and to lock it in this position by merely tightening the nut 6 on bolt 3. The horizontal portion 5b of the tube is internally threaded near its upper end and a slit 7 is provided at the same end. A conical screw cooperates with the internal thread of said tube to expand the tube in order to force said tube end against the walls of a hole 11a, provided in the holder 11 shown in FIG. 1. This holder 11, being U-shaped, has in its upright flange 11c a slot 12 and flange 11b of said holder has a slot 11d. Slots 12 and 11d slant inwardly toward the bottom 11e of said holder and are inclined relative to each other in such a manner that two resilient plates 9 and 10, each of which have one end guided in one of said slots will have their free ends in resilient contact under an angle α, see FIG. 3. Plate 9 is pivotably connected vertically by means of bolt 13 extending laterally therethrough to flange 11b and is held in its normal position by means of a coil spring 14. Coil spring 14 is positioned in the top of slot 11d between a bar 14a fixedly connected to flange 11b and plug 14b seated on shoulder 9a of plate 9 tending to pivot said plate 9. However, plate 9 has a side 9b which contacts plate 11f fixedly conncted to holder 11 providing a stop for plate 9 when the free end thereof is against the free end of plate 10 as shown in FIG. 1, but permitting the downward pivoting of plate 9 against spring 14. The free end of plate 9 is convex and circularly shaped on a radius R extending from bolt 13. Owing to the fact that the corresponding free end contour of plate 10 is correspondingly, but inversely shaped, that is concave, plate 9 may be moved downwardly in the direction of the arrow A in order to clear the device. Plate 10 is preferably adjustable relative to plate 9, since plate 10 has slots 10a and bolts 10b extending through flange 12 and said slots 10a with nuts (not shown) on the exterior ends of said bolts for tightening the flange against that plate to adjustably retain the plate in a desired position.

Plate 10 has fastened to one side thereof a curved end front plate 15, which extends over the free end of plate 9 and thus serves as a stop which prevents the plates from being swung laterally beyond a certain angle. Along the opposite side of plate 10 is positioned a narrow, upper spacer 16 and a wider lower spacer 19 is secured to said plate. To the latter is fastened a cover 18 having a U-shaped channel portion 18a, see FIGS. 2 and 3. In the space between the U-shaped portion of cover 18, and the narrower, upper spacer 16, a knife 17 is loosably mounted resting against spacer 19.

In using the device a thread connected series of workpieces coming from a sewing machine is placed with its thread over the free ends of plates 9 and 10. As the device is preferably set to make an angle with the vertical plane, the thread will be moved in the direction of the arrow B in FIG. 3, with the result that the thread swings the plates 9 and 10 away from each other to such an extent that the thread thereafter comes into contact with the knife 17, one workpiece is separated from the rest of the workpieces, but it does not fall down as the resilient plates 9 and 10 hold the thread clamped. Thus the workpieces will remain in the device, hanging in its thread where it can be readily picked up by a transfer device (not shown).

In the embodiment shown in FIG. 5 the numerals 19a and 20 designate two stationary offset plates having spaced apart free ends and 21 designates the knife, which latter is spaced a distance, perpendicular to the plane of the drawing, from the plates. A movable clamping element 22 is pivotably connected by pin 24 to plate 19a and is urged by means of a coil spring towards the free end of plate 20 to clamp the thread therebetween.

What I claim is:

1. A device for separating consecutive workpieces of a series of workpieces interconnected by a thread comprising a holder, a pair of resilient plates connected to said holder at one of their ends and extending on an angle towards one another with their opposite free ends meeting, one of said plates being pivotably connected to said holder for movement of its free end along the free end of the other of said plates, a stop carried by said holder, resilient means tending to position said one of said plates against said stop with its free end slideable on the free end of the other of said plates, a cutting element and means retaining said cutting element spaced from one side of said plate free ends whereby the thread between consecutive workpieces can be clamped between said plate free ends, severed by said cutting element and the workpiece will hang down by its thread clamped between said plate free ends.

2. A device as claimed in claim 1 wherein said plate free ends are curved on a radius extending from the pivotal point of said pivoted plate and the other of said plates is adjustably connected to said holder for being positioned relative to said pivoted plate.

3. A device as claimed in claim 1 including a U-shaped channel member attached to one of said plates and extending over the other of said plates providing a lateral stop therefor and a guide for said cutting element positioned therein.

4. A device as claimed in claim 1 including a spacing member carried by one of said plates between said plates and said cutting element to determine the length of the thread between said plate and the free end of the thread.

5. A device as claimed in claim 1 including an adjustable support for said holder.

6. A device as claimed in claim 1 wherein said holder has an opening therein, an L-shaped tube has a leg extending in said holder opening, means adjustably retains said leg in said holder opening and means for adjustably supporting the other leg of said tube.

7. A device as claimed in claim 6 wherein said means for adjustably supporting the other leg of said tube includes a clamp, a sleeve carried by said clamp, a bolt having a lateral opening on one side of said sleeve through which extends said tube other leg and extending through said sleeve and a nut in threaded engagement with said bolt on the other side of said sleeve.

8. A device as claimed in claim 6 wherein said tube leg in said holder opening has a slit and internally threaded end and an expansion element is in threaded engagement with said tube end for expanding said tube end against said holder to adjustably position said tube leg in said holder opening.

References Cited

UNITED STATES PATENTS

| | | | |
|---|---|---|---|
| 26,570 | 12/1859 | Daniels | 269—217 |
| 2,445,629 | 7/1948 | Newton | 112—252 |
| 3,106,902 | 10/1953 | Foltis et al. | 112—252 |

PATRICK D. LAWSON, *Primary Examiner.*

H. H. HUNTER, *Assistant Examiner.*